United States Patent [19]

Armstrong

[11] 4,264,390

[45] Apr. 28, 1981

[54] METHOD AND APPARATUS FOR MAKING PIPE SECTIONS IN MATERIALS

[75] Inventor: David E. Armstrong, Royal Oak, Mich.

[73] Assignee: General Motors Corporation, Detroit, Mich.

[21] Appl. No.: 76,212

[22] Filed: Sep. 17, 1979

[51] Int. Cl.³ .............................................. B31F 1/29
[52] U.S. Cl. .................................. 156/205; 156/210; 156/469; 156/470; 156/471; 156/474; 425/369
[58] Field of Search ............... 156/205, 206, 209, 210, 156/469, 470, 471, 472, 473, 474; 428/158–160; 425/369

[56] References Cited

U.S. PATENT DOCUMENTS

| | | | |
|---|---|---|---|
| 2,693,221 | 11/1954 | Lyijynen | 156/209 |
| 3,067,806 | 12/1962 | Trelease | 156/203 |
| 3,540,079 | 11/1970 | Bush | 425/370 |
| 4,101,367 | 7/1978 | Maier | 156/472 |
| 4,202,719 | 5/1980 | Linn | 156/470 |

*Primary Examiner*—William J. Van Balen
*Attorney, Agent, or Firm*—Edward J. Biskup

[57] ABSTRACT

An apparatus and method for providing permanent pipe sections in a foam-backed material that utilizes two rotating members which cooperate to form alternate ridges and valleys in the material after which the valley portions are bonded to a backing sheet so as to maintain the pipe sections in the material.

4 Claims, 5 Drawing Figures

METHOD AND APPARATUS FOR MAKING PIPE SECTIONS IN MATERIALS

This invention concerns a method and apparatus for forming permanent pipe sections in a foam-backed material.

Many present day vehicle seats and door trim panels have portions thereof covered with decorative pleated sections composed of a fabric and a foam-backing which are sewn together so as to form rows of pipe or riser sections. These pipe sections are made by repeatedly feeding the fabric and backing composite into a multiple needle sewing machine, so upon each feeding, several pipe sections are formed. Because of restrictions on the minimum distance between the multiple needles, difficulty has been encountered in trying to sew narrow, high loft pipe sections into the material. Likewise, it has not been possible to dielectrically emboss high loft type pipe sections because the material tends to flatten out.

Accordingly, the objects of the present invention are to provide a new and improved method and apparatus to facilitate the forming of a plurality of high loft risers in a sheet of foam-backed fabric or the like; to provide a new and improved apparatus and method for forming a foam-backed flexible cover sheet of material into a corrugated form; to provide a new and improved pleater device which untilizes two rotating members for alternately forming ridge and valey portions in a flexible sheet of foam-backed material while at the same time bonding the valley portions of the material to a backing sheet so as to permanently set pipe or riser sections in the material; and to provide a new and improved apparatus and method for providing narrow, high loft pipe sections in a foam-backed fabric with adjacent pipe sections abutting each other so as to conceal the areas where the fabric is bonded to the backing sheet.

In the preferred form, the above objects and others are realized by an apparatus which includes a base that supports a first rotatable member having a plurality of radially extending blades. A second rotatable member is located on the base adjacent the first rotatable member and is provided with a plurality of circumferentially spaced rods which are adapted to sequentially move into the space between a pair of blades when one of the members is drivingly rotated. The arrangement is such that when a foam-backed material is fed between the rotatable members, the material is formed into folds or pipe sections having alternate ridge and valley portions. In addition, an arcuate guide member is provided which partially surrounds the first rotatable member and serves to maintain the folds in the material after the rod moves out of the area between a pair of blades. During this time, a backing sheet with an adhesive thereon is fed into the guide member and the latter is heated for causing the adhesive to bond the backing sheet to the valley portions so that the foam-backed material permanently maintains the folds formed therein.

A more complete understanding of the present invention will be derived from the following detailed description when taken with the drawings in which.

Figure 1:
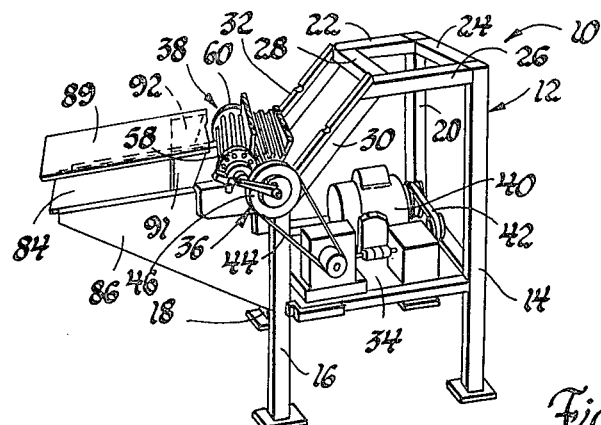
FIG. 1 is a perspective view showing an apparatus made in accordance with the invention.

Referring to the drawings and more particularly FIG. 1 thereof a pleating or pipe forming apparatus 10 made in accordance with the present invention is shown comprising a base 12 formed with four upstanding legs 14, 16, 18, 20 which are interconnected at their upper ends by cross members 22, 24, 26, 28 and inclined members 30, and 32 so as to provide a rigid frame. Intermediate portions of the legs 14, 16, 18 20 are also interconnected by suitable cross members and provide a support platform 34 for a drive train which serves to drive a pair of horizontally disposed rotatable members 36 and 38. In this regard, it will be noted that the drive train includes an electric motor 40, the output shaft of which is drivingly connected through an endless belt 42 to a reduction gearing arrangement which in turn, is connected through an endless belt 44 to a pulley 46 fixedly mounted to the rotatable member 36. As will be apparent as the description of the invention proceeds, the rotatable members 36 and 38 cooperate in forming folds having alternate ridge and valley portions in a foam-backed cover sheet of material which subsequently is combined with a backing sheet for maintaining the folds in a set position.

Figure 2:
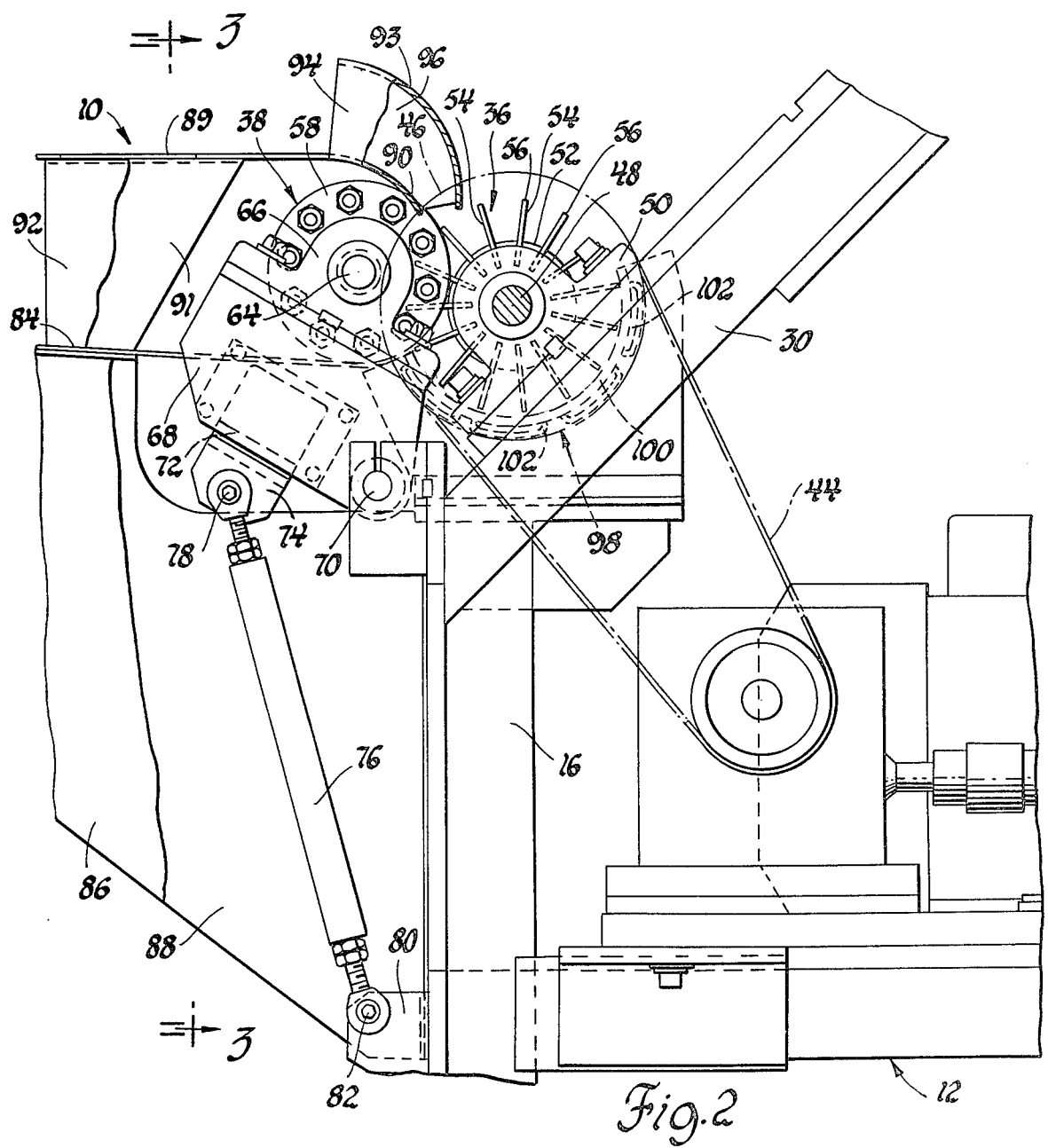
FIG. 2 is an enlarged side elevational view showing a portion of the apparatus of FIG. 1.

More specifically, the rotatable member 36 serves as a tooling drum and includes an elongaged shaft 48 one end of which is fixed with the pulley 46. The shaft 48 is supported for rotation about a horizontal axis by a pair of identical bearing blocks, one of which only is shown mounted on the inclined member 30 as seen in FIG. 2 and identified by the reference numeral 50. The shaft 48 has an elongated cylindrical hub 52 fixed thereto which carries a plurality of identical blades 54 which extend radially from the center of the shaft 48 and terminate with a blunt or flat edge 56 which lies in a circle having its center at the center of the shaft 48. Each blade 54 is made from sheet metal having a thickness which provides sufficient rigidity to prevent flexing during operation of the apparatus. Moreover, the blades 54 are uniformly spaced along the circumference of the hub 52 and extend longitudinally from one end to the other of the hub 52.

Figure 3:
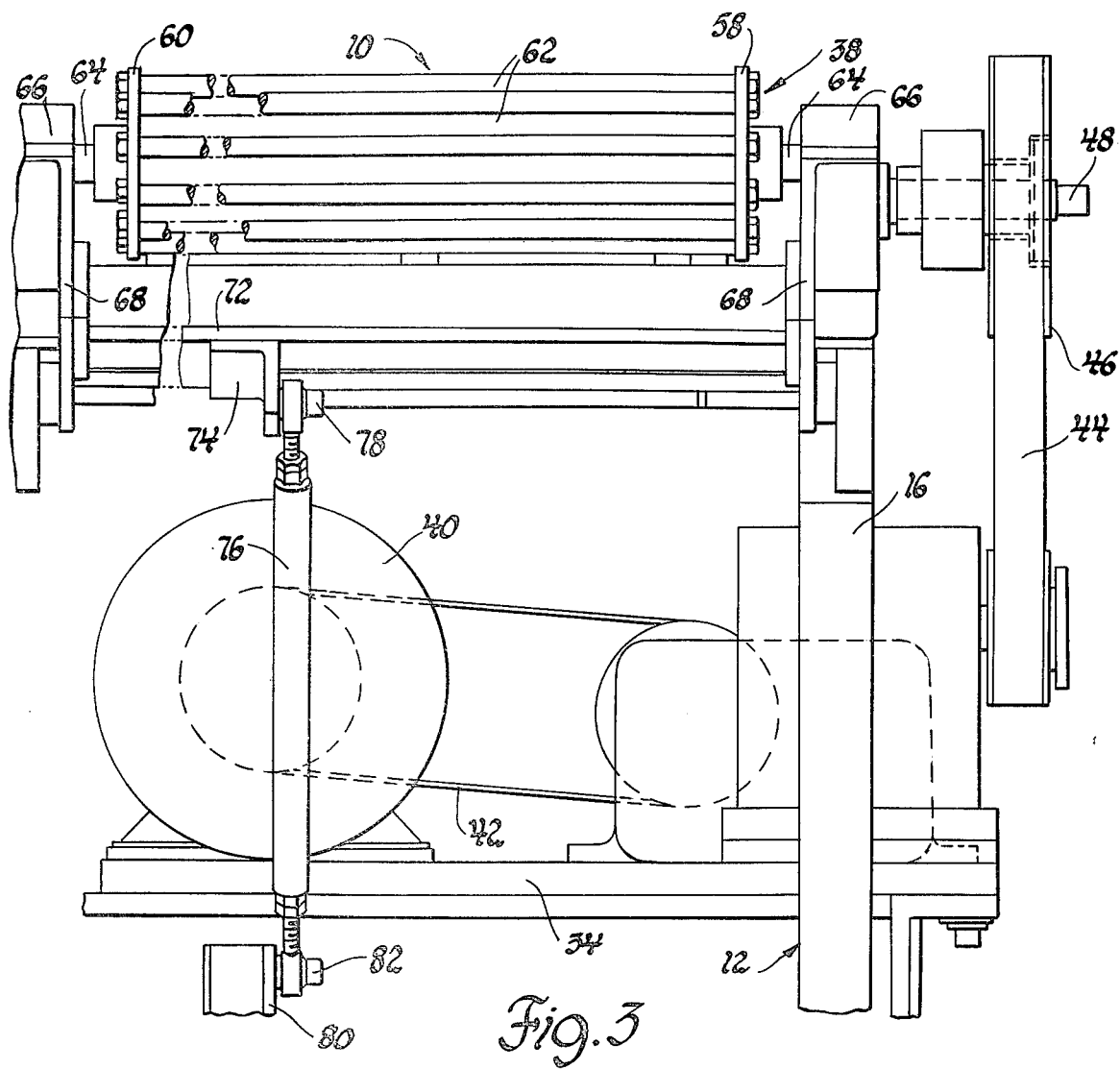
FIG. 3 is a view taken on lines 3—3 of FIG. 2.

The other rotatable member 38 serves as a tucking drum and is adjacent to but forwardly of the rotatable member 36. As seen in FIGS. 2 and 3, the rotatable member 38 comprises a pair of laterally spaced disc members 58 and 60 which are connected by a plurality of identical, horizontally disposed, and parallel cylindrical rods 62 which are uniformly circumferentially spaced about the associated disc member. Each disc member 58 and 60 is formed with a stub shaft 64 which is journalled within a bearing block 66 mounted on a side support 68 which, in turn, is connected by a pivot connection 70 to the base 12. As seen in FIG. 3, the laterally spaced side supports 68 are interconnected by a transversely extending bar 72, an intermediate portion of which has a bracket 74 fixed thereto. A turnbuckle 76 has its upper end connected to the bracket 74 by a pivot connection 78, while its lower end is connected to a bracket 80 fixed to the base 12 by a pivot connection 82. Thus, by shortening or lengthening the turnbuckle 76, the rotatable member 38 can be pivoted about the center of the pivot connection 70 so as to adjust the position thereof for reasons which will be explained hereinafter.

A horizontal table 84 is located below the rotatable member 38 and is supported in position by a pair of triangular frame members 86 and 88 which are laterally spaced from each other in vertical planes and are respectively fixed with the legs 16 and 18 of the base 12. As shown in FIG. 1, a second horizontal table 89 is mounted above the table 84 with the forward end portion 90 thereof being curved downwardly and terminating adjacent to an upper portion of the rotatable member 38. The table 89 is carried by a pair of laterally spaced upright plate members 91 and 92 the lower end of each of which is fixed to the associated side support while the upper end is fixed with the underside of the table 89. As seen in FIG. 2 a curved plate 93, which is coextensive with the rotatable member 38, is located above the end portion 90 of the table 89 and is joined thereto by a pair of side walls 94 and 96. Thus, the curved plate 93 and the end portion 90 of the table 89 form a guide pocket which receives foam-backed material as will be described hereinafter.

As seen in FIG. 2, located below the rotatable member 36 is a guide member 98 comprising a semi-circular plate 100 the concave inner surface of which is uniformly spaced from the edges 56 of the blades 54. The guide member 98 is coextensive with the blades 54 and is provided with a plurality of heater elements 102 attached to the outer surface thereof. The heater elements 102 serve to heat the plate 100 for reasons to be explained hereinafter.

Thus, from the above description, it should be apparent that the motor 40 and drive train system mounted on the base 12 serves to rotatably drive the rotatable member 36 in a counterclockwise direction as seen in FIG. 2. It should also be apparent that because of the meshing arrangement of the rotatable members 36 and 38, and as the rotatable member 36 is driven, the blades 54 provide corresponding drive to the rotatable member 38 which will rotate in a clockwise direction as seen in FIG. 2. During such time, rods 62 carried by the rotatable member 38 enter the area between a pair of adjacent blades 54 at a point adjacent to the guide pocket and move out of the area between the blades 54 at a point just prior to the blades 54 entering the guide member 98.

Figures 4, 5:
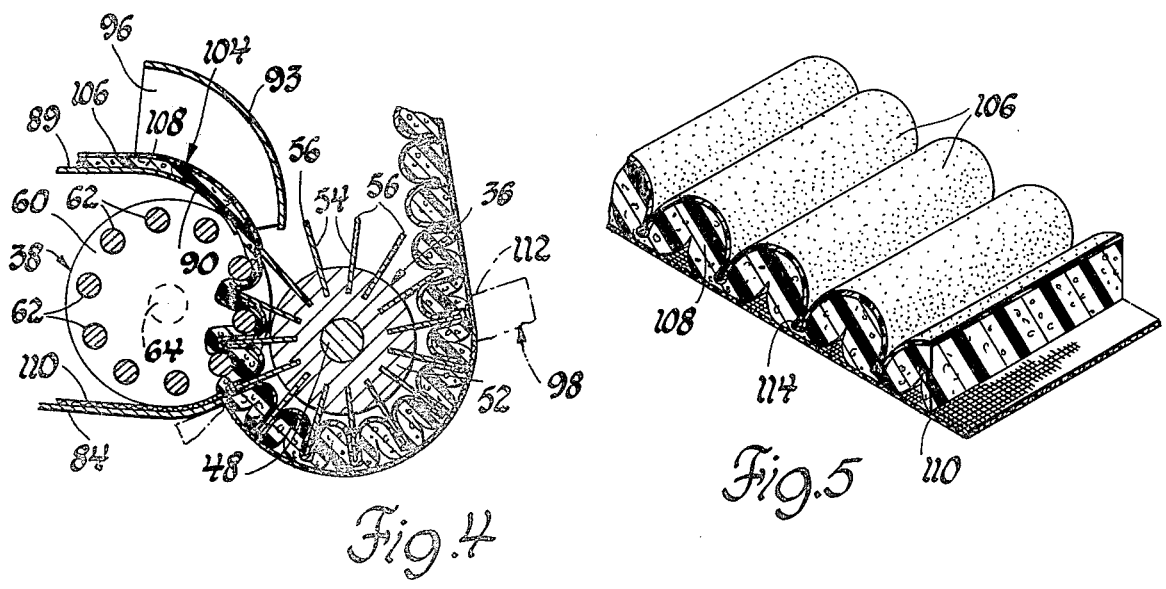
FIG. 4 is a view showing a foam-backed material and a backing sheet being fed into the rotatable members of the apparatus shown in FIGS. 1-3 and illustrates the forming of the folds in the material.
FIG. 5 is a perspective view showing the final article made by use of the apparatus and method illustrated in FIGS. 1-4.

As aforementioned, the apparatus described above serves to form permanent folds or pipe sections in a sheet of pliable material. The forming operation is shown in FIG. 4 with a sheet of foam-backed material 104 being located on the table 89 and being fed through the guide pocket into the area between the rotatable members 36 and 38 so as to cause the blades 54 to initially engage the cover sheet portion 106 of the foam-backed material 104 while the rods 62 make contact with the foam portion 108 of the material 104. It will be noted, that during the forming operation, a rod 62 will move into the area between adjacent blades 54 and force the material 104 into this area to thereby form a ridge portion and a valley portion the latter of which bridges the edge 56 of each blade 54. At the point where the rod 62 moves out of the area between adjacent blades 54, the fold in the material 104 maintains its position due to valley portions engaging the arcuate plate 100 of the guide member 98. At this point, a backing sheet 110 on the support table 84 is fed towards the rotatable member 36 and, as a result of frictional engagement between the valley portion and the backing sheet 110, causes the backing sheet 110 to move progressively into the guide member 98 in contact with the foam portion 108 of adjacent valley portions of the folded material 104. The backing sheet 110 has a sheet of heat sensitive adhesive deposited thereon prior to entering the guide member 98 or, in the alternative, may have an adhesive impregnated within the backing sheet 110. In either case, the adhesive is heated by the heating elements 102 in the guide member 98 as the backing sheet 110 progresses along the inner concave surface of the plate 100. The heating operation causes the backing sheet 110 to be bonded to the valley portions of the folded material. Simultaneously, the heat provided by the plate 100 causes the compressed foam portion 108 located between the edge 56 of the blade 54 and the plate 100 to take a permanent set. As a result, when the folds are released by the rotatable member 36 at the point where the guide member 98 ends, as indicated by the reference numeral 112 in FIG. 4, the folds are permanently set in position and provide an article such as seen in FIG. 5.

An apparatus made according to the invention and successfully used in making a pleated article as shown in FIG. 5 had a rotatable member 38 provided with ten rods 62 each of which was 0.50 inch in diameter. The longitudinal center axis of each rod lies on a circle having its center at the center of the stub shaft 64 and had a diameter that measured 3.187 inches. The rotatable member 36 was provided with fifteen blades 54 each of which was made from a sheet of aluminum having a thickness of 0.063 inch with the edges 56 lying in a circle that measured 4.875 inches in diameter. The center to center distance between the shafts 48 and 64 measured 3.68 inches and a clearance in the range of 0.020 to 0.030 inch existed between the surface of plate 100 and the blade edges 56. The heater elements 102 in the guide member 98 operated on a 120 volt system and each was rated at 725 watts.

The apparatus specifically described above was used with a foam-backed material 104 that was a laminated composite comprising a cover sheet portion 106 made of a fabric identified as "Windsor" Tricot Knit, part number 7012WC, and purchased from Blue Ridge Winkler Textiles, of Bangor, Pa. The foam portion 108 was approximately 0.375 inch thick, bonded to the cover sheet portion 106, and was identified as a free blown polyurethane foam, F.A.S.T., made according to specification FBMS 7-23 and purchased from Curon Division of Reeves Brothers, Inc., of Cornelius, N.C., and E. R. Carpenter Co., Inc., of Birmingham, Mich. This is an open cell medium density foam which is heat sealable at 338° F. minimum. Any other type of foam material that can be heat sealed under pressure can be used. The backing sheet 110 was a square woven polyester fabric having a 26×32 count purchased from Acme Mills Co., of Detroit, Mich., and made according to specification FBMS 23-16 . The backing sheet 110 was combined with an adhesive purchased from Hercules, Inc., of Wilmington, Del., and having a high molecular weight polyethylene in dot pattern connected by thin struts and identified as Delnet-KX215. Other forms of adhesive that can be used with the backing sheet 110 can be purchased from PNC Division of Inmont Corporation, of Akron, Ohio, and are identified as #3625 and #3180 both of which are in a discontinuous web form and contain ethylene vinyl acetate. All of these adhesives melt below 300° F., are thermoplastic, and are used in weights between 0.8 and 1.1 ounces per square yard of backing sheet material. Heater elements 102 associated with the guide member 98 were capable of heating the adhesive to a temperature between 360° F. and 390° F. and the rotatable member 36 was driven at a speed which allowed the backing sheet 110 to be in contact with the heated guide member 98 for 30 seconds with the spacing between the outer edge 56 of each blade 54 and the concave inner surface of the plate 100 being set so that the sandwiched valley portions were subjected to a pressure in the range of 300 to 500 psi.

The completed article made by the apparatus and method described above is illustrated in FIG. 5. It will be noted that the article, when made with a cloth material as the cover sheet portion, will have pipe sections with the side portions of the pipe sections abutting each other and consequently concealing the bonding area indicated by the reference numeral 114. As a result, an attractive and decorative article is presented to the viewer.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. An apparatus for forming permanent pipe sections in a foam-backed pliable material comprising, a base supporting a first rotatable member having a plurality of radially extending blades, a second rotatable member located adjacent said first rotatable member and provided with a plurality of circumferentially spaced rods, bearing means supporting said second rotatable member on said base so as to cause said rods to sequentially move said foam-backed material into the space between adjacent blades and form folds therein having alternate ridge and valley portions when one of said members is drivingly rotated, plate means partially surrounding said first rotatable member for guiding an adhesive supporting backing sheet into engagement with said valley portions of the folds, and a heater for heating said plate means to cause the adhesive on the backing sheet to bond the latter to the valley portions of the folds to provide permanent pipe sections in the foam-backed material.

2. An apparatus for forming permanent pipe sections in a foam-backed pliable material comprising, a base supporting a first rotatable member having a plurality of radially extending blades the edges of which are located in a common circle, a second rotatable member located adjacent said first rotatable member and provided with a plurality of circumferentially spaced cylindrical rods, adjustable means supporting said second rotatable member on said base so as to cause said rods to move towards or away from the first rotatable member and to sequentially move said foam-backed material into the space between adjacent blades and form folds therein having alternate ridge and valley portions when one of said members is drivingly rotated, semi-circular plate means partially surrounding said first rotatable member for temporarily maintaining the folds in the material and for guiding an adhesive supporting backing sheet into engagement with said valley portion of the folds, and a heater for heating said plate means to cause the adhesive on the backing sheet to bond the latter to the valley portions of the fold to provide permanent pipe sections in the foam-backed material.

3. A method of making a decorative article with a pleating apparatus having a pair of rotatable members, one member of which is provided with a plurality of pairs of radially extending blades and the other of which has a plurality of circumferentially spaced rods, said method comprising the steps of positioning said pair of rotatable members relative to each other so that one of said rods moves progressively into and out of the area between one pair of said plurality of pairs of blades while said pair of rotatable members are rotating; feeding a cover sheet between said pair of rotatable members so as to cause said one of said rods to contact one side of said cover sheet and move a portion of said cover sheet into the area between said one pair of said plurality of blades to form a fold having a ridge portion and a pair of valley portions, with said ridge portion being located between said one pair of said plurality of blades and said pair of valley portions being located at the ends of said one pair of said plurality of blades; maintaining said ridge portion within said area between said one pair of said plurality of blades after said one of said rods moves out of said area; and simultaneously bonding a backing sheet to the other side of said cover sheet between said pair of valley portions so said fold is permanently maintained in said cover sheet.

4. A method of making a decorative article with a pleating apparatus having a pair of rotatable members, one member of which is provided with a plurality of pairs of radially extending blades and the other member of which has a plurality of circumferentially spaced rods, said method comprising the steps of positioning said pair of rotatable members relative to each other so that one of said rods moves progressively into and out of the area between one pair of said plurality of pairs of blades while said pair of rotatable members are rotating; feeding a cover sheet having a foam material on one side thereof between said pair of rotatable members so as to cause said one of said rods to contact said cover sheet and move a portion of said cover sheet into the area between said one pair of said plurality of blades to form a fold having a ridge portion and a pair of valley portions, with said ridge portion being located between said one pair of said plurality of blades and said pair of valley portions being located at the ends of said one pair of said plurality of blades; compressing portions of said foam material located at said ends of said one pair of said plurality of pairs of blades so as to maintain said ridge portion within said area between said one pair of said plurality of blades after said one of said rods moves out of said area; simultaneously feeding an adhesive-carrying backing sheet into engagement with the compressed portions of said foam material; and applying heat to said backing sheet to melt the adhesive carried thereby and interconnect said pair of valley portions so that said fold is permanently maintained in said cover sheet.

* * * * *